United States Patent
Patil et al.

(10) Patent No.: US 11,155,729 B2
(45) Date of Patent: Oct. 26, 2021

(54) GRAFT COPOLYMERS AND COMPOSITIONS THEREOF

(71) Applicant: Clariant International Ltd., Muttenz (CH)

(72) Inventors: Prerana Maruti Patil, Maharashtra (IN); Smita Amit Gholam, Mumbai (IN); Ketan Sunil Kulkarni, Maharashtra (IN)

(73) Assignee: Clariant International Ltd., Muttenz (CH)

( * ) Notice: Subject to any disclaimer, the term of this patent is extended or adjusted under 35 U.S.C. 154(b) by 139 days.

(21) Appl. No.: 16/301,970

(22) PCT Filed: Apr. 26, 2017

(86) PCT No.: PCT/EP2017/059856
§ 371 (c)(1),
(2) Date: Nov. 15, 2018

(87) PCT Pub. No.: WO2017/198428
PCT Pub. Date: Nov. 23, 2017

(65) Prior Publication Data
US 2019/0153257 A1   May 23, 2019

(30) Foreign Application Priority Data
May 18, 2016   (EP) .................................... 16170060

(51) Int. Cl.
*C09D 151/00* (2006.01)
*C09D 155/00* (2006.01)
(Continued)

(52) U.S. Cl.
CPC ............ *C09D 151/003* (2013.01); *C08F 2/38* (2013.01); *C08F 265/04* (2013.01);
(Continued)

(58) Field of Classification Search
CPC .................................................... C08F 265/04
See application file for complete search history.

(56) References Cited

U.S. PATENT DOCUMENTS

| | | |
|---|---|---|
| 4,329,266 A | 5/1982 | Suzuki |
| 5,231,131 A | 7/1993 | Chu |

(Continued)

FOREIGN PATENT DOCUMENTS

| | | |
|---|---|---|
| CA | 2144381 A1 | 9/1995 |
| CN | 1152329 | 6/1997 |

(Continued)

OTHER PUBLICATIONS

Li et al. Soft Matter, 8, 11051-11061 (Year: 2012).*

(Continued)

*Primary Examiner* — Mark S Kaucher
(74) *Attorney, Agent, or Firm* — Tod A. Waldrop

(57) ABSTRACT

This invention relates to a graft copolymer comprising:
a) a macromonomer, wherein the macromonomer comprises in polymerized form a first monoethylenically unsaturated monomer selected from a group consisting of esters of methacrylic acid and acrylic acid with straight or branched alcohols having 1 to 3 carbon atoms and no more than 5 mole % an addition fragmentation chain transfer agent; and
b) at least one side chain on the macromonomer, wherein the at least one side chain comprises at least 95 wt.-% of acrylic acid in polymerized form, and its use for improving the dirt pick-up resistance of a paint or coating.

12 Claims, 5 Drawing Sheets

NMR of macromonomer

(51) Int. Cl.
*C08F 290/04* (2006.01)
*C08F 2/38* (2006.01)
*C09D 5/02* (2006.01)
*C08F 265/04* (2006.01)
*C09D 5/00* (2006.01)

(52) U.S. Cl.
CPC ............ *C08F 290/046* (2013.01); *C09D 5/00* (2013.01); *C09D 5/024* (2013.01); *C09D 155/005* (2013.01)

(56) References Cited

U.S. PATENT DOCUMENTS

| | | | |
|---|---|---|---|
| 5,750,619 | A | 5/1998 | Barsotti |
| 6,107,392 | A | 8/2000 | Antonelli |
| 6,258,887 | B1 | 7/2001 | Bardman |
| 6,303,186 | B1 | 10/2001 | Bors |
| 6,303,188 | B1 | 10/2001 | Bors |
| 6,599,973 | B1 | 7/2003 | Visscher |
| 2002/0151648 | A1 | 10/2002 | Fasano |
| 2003/0153676 | A1 | 8/2003 | Brinkhuis |
| 2005/0159555 | A1 | 7/2005 | Shimanaka |
| 2006/0009574 | A1* | 1/2006 | Aert ............... C08F 2/22 524/832 |
| 2015/0275025 | A1 | 10/2015 | Fujii |
| 2015/0344685 | A1 | 12/2015 | Lee |
| 2016/0289940 | A1* | 10/2016 | Hardwick ............ E03D 9/00 |

FOREIGN PATENT DOCUMENTS

| | | |
|---|---|---|
| EP | 1138730 | 10/2001 |
| EP | 1950232 | 7/2008 |
| JP | 2003138090 | 5/2003 |
| JP | 2005112907 | 4/2005 |

OTHER PUBLICATIONS

Hadjichristidis et al Graft copolymers Encyclopedia of Polymer Science and Technology (Year: 2010).*
Peng et al. Polymer 48, 5250-5258.*
International Preliminary Report on Patentability for App. No. PCT/EP2017/059856, dated Nov. 20, 2018, 6 pages.
International Search Report on Patentability for App. No. PCT/EP2017/059856, dated Jul. 10, 2017, 2 pages.
Jaffe, E. E. 2004. "Pigments, Organic". Kirk-Othmer Encyclopedia of Chemical Technology, 52 pages.
The Kirk-Othmer Encyclopedia of Chemical Technology, Fourth Edition, "Paint", vol. 17, John Wiley, p. 1049-1069 ISBN 0-471-52686-X.
XP055385779 "Graft Copolymers", Encyclopedia of Polymer Science Technology, vol. 6, 2012, pp. 348-385.

* cited by examiner

Fig. 1    NMR of macromonomer
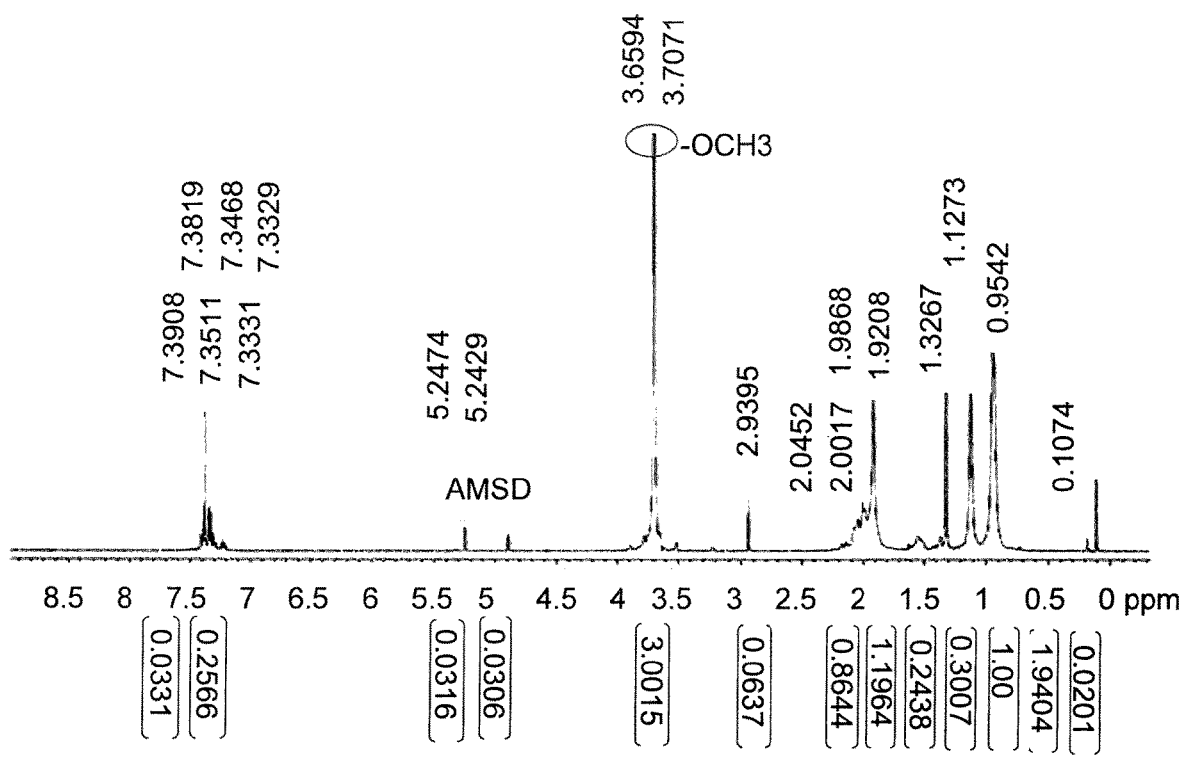

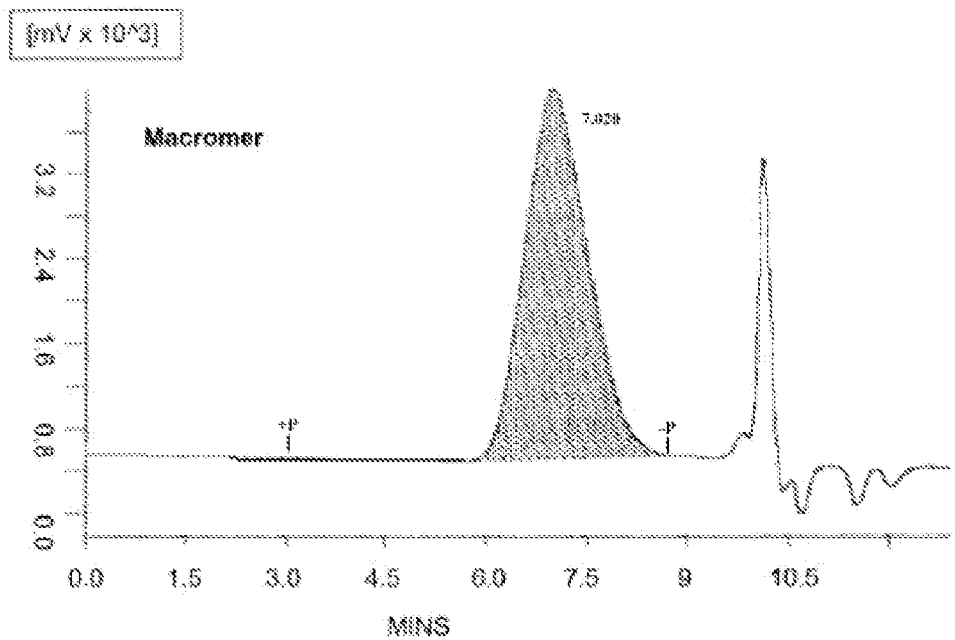
Fig. 2 GPC of macromonomer

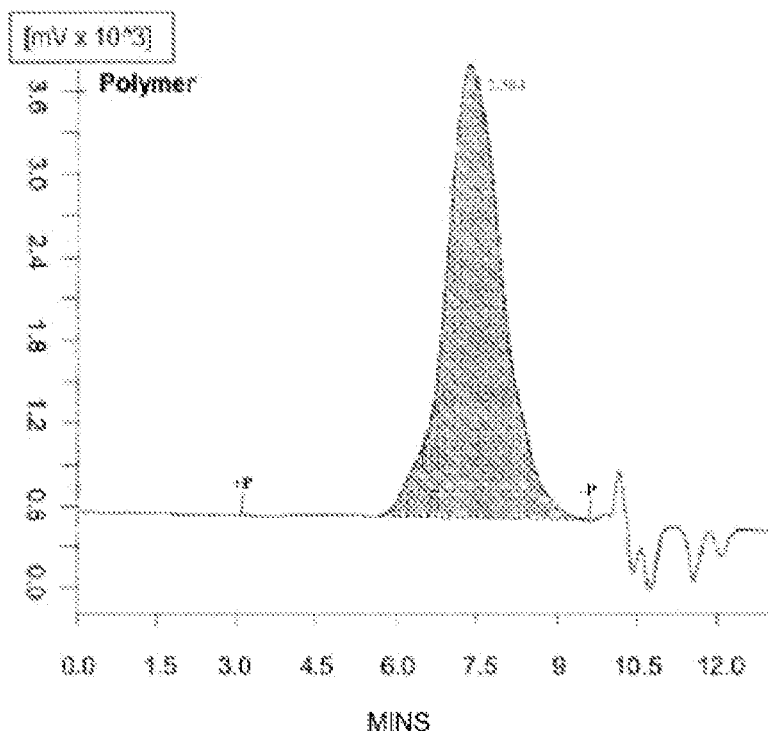
Fig. 3  GPC of graft copolymer

Fig. 4    13C NMR of graft copolymer
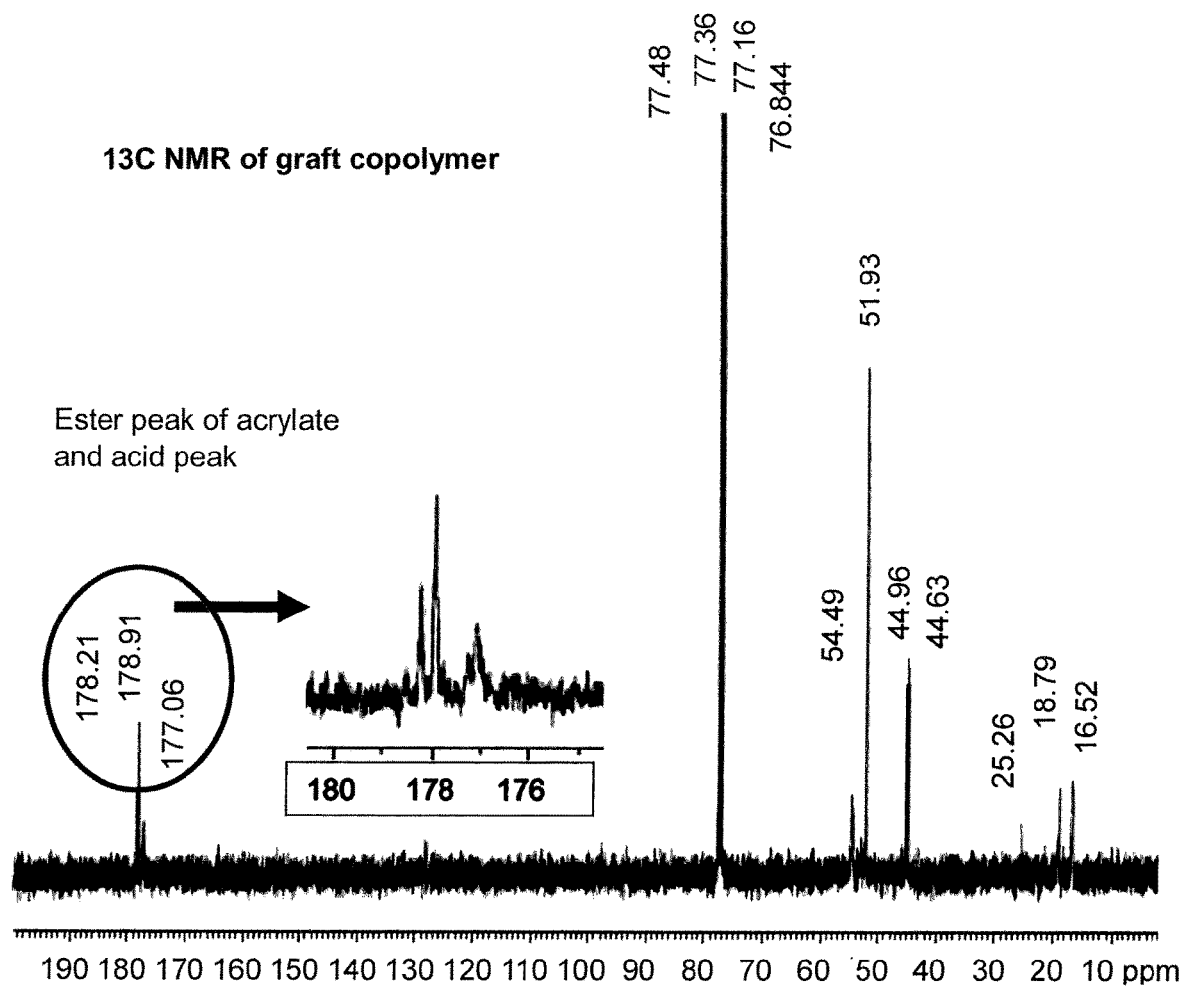

Fig. 5  Image of paper panels displaying dirt pick-up resistance of blank and sample
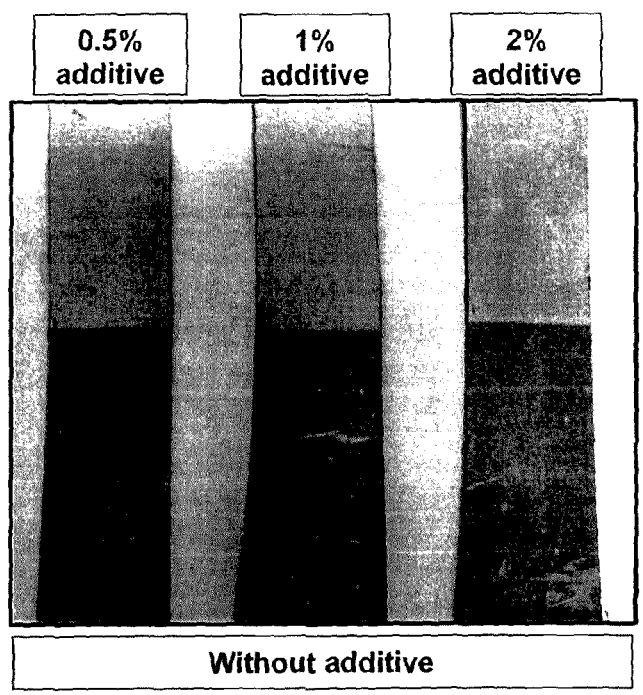

GRAFT COPOLYMERS AND COMPOSITIONS THEREOF

The invention relates to graft copolymers and compositions containing the graft copolymers. The invention also relates to application of the graft copolymers and their compositions as additives in paint or coating formulations.

Exterior coatings when exposed to atmosphere tend to pick up particles of dirt or dust, which causes slight discoloration as well as degradation of the coating over time. It is also observed that under hot and humid conditions the dirt pick-up resistance of coatings is further diminished. The dirt pick-up resistance of a coating can be enhanced by providing a harder finish by raising the glass transition temperature (Tg). However, increase in the Tg results in a decrease in the flexibility of the coating leading to formation of cracks. Moreover, this may also require the use of coalescing solvents, which typically have a high volatile organic compound (VOC) content. This would be in direct contrast to industry requirement for coatings formulations having low or zero-VOC which is being driven by environmental concerns as well as by government regulations.

CA-2144381A1 discloses the use of a polymer composition comprising as monomer components N-methylol (meth)acrylamide, and one or more of alkyl acrylates, alkyl methacrylates, styrene, vinyl acetates and/or vinyl esters. The polymer has a Tg of from −20° C. to 40° C. and impart dirt pickup resistance to a coating composition.

U.S. Pat. No. 6,303,186B1 and U.S. Pat. No. 6,303,188B1 assigned to Rohm and Haas describe coalescent-free aqueous coating composition containing an aqueous emulsion-polymerized polymeric binder having a glass transition temperature from about −35° C. to about +25° C. The binder contains at least one copolymerized ethylenically-unsaturated active methylene monomer, preferably bearing an acetoacetate functionality.

US-20150275025A1 discloses a graft copolymer for use as a viscosity controlling agent. The graft copolymer comprises a backbone obtained by polymerizing a monomer component that contains C4-C24 alkyl-containing unsaturated monomer with an unsaturated monomer containing a hydrophilic group.

US-20050159555A1 discloses a graft copolymer formed by copolymerization of a macromonomer and a monomer, wherein the macromonomer is a polymer of an ester monomer and an addition-polymerizable monomer having an acidic group and having an acid value of from 100 to 300; and the monomer is an addition-polymerizable monomer. The macromonomer is grafted on the backbone of the graft copolymer.

US-20020151648A1 discloses a comb copolymer comprising a backbone and at least one graft segment wherein the graft segment as polymerized unit contains less than 5 weight percent acid containing monomer, based on the total weight of said macromonomer. The comb copolymer has a Hard/Soft Balance Advantage value of at least 25%.

U.S. Pat. No. 6,599,973 discloses novel graft copolymers having mixed anionic and nonionic side chains on a hydrophobic backbone.

U.S. Pat. No. 6,258,887 discloses a dirt pickup resistant coating comprising multi-stage emulsion polymer including a first polymer containing a copolymerized ionic monomer and a crosslinked second polymer of different composition.

U.S. Pat. No. 6,107,392 describes a composition for finishing automobile exteriors comprising graft copolymers. The side chains of the graft copolymers are hydrophobic compared to the backbone of the graft copolymer.

U.S. Pat. No. 5,231,131 describes a graft copolymer having a hydrophobic backbone and hydrophilic side chains attached to the backbone prepared by catalytic chain transfer polymerization using cobalt complexes. The presence of cobalt in the finished product is undesirable because of the typical colour they tend to impart to the product, and also due to the health and environmental aspects associated with use of heavy metals such as cobalt.

U.S. Pat. No. 4,329,266 assigned to Kansai paint Co. Ltd. describes water-dispersed coating composition comprising an acrylic graft polymer. The acrylic graft polymer is produced through the reaction of an acrylic polymer and a monomeric mixture in presence of hydrophilic organic solvents.

There is a continuing need for coatings that provide enhanced dirt pick-up resistance, while at the same time achieve suitable elastomeric properties. It is further desirable that such a solution meets the industry requirement for formulations having minimal or zero-VOC.

It has been found that graft copolymers made from a macromonomer of (meth)acrylic esters as graft base, and essentially or exclusively acrylic acid polymer side chain as graft segment solve the problem.

In a first embodiment of the invention, there is provided a graft copolymer comprising:
a) a macromonomer, wherein the macromonomer comprises in polymerized form a first monoethylenically unsaturated monomer selected from a group consisting of esters of methacrylic acid and acrylic acid with straight or branched alcohols having 1 to 3 carbon atoms and no more than 5 mole % an addition fragmentation chain transfer agent; and
b) at least one side chain on the macromonomer, wherein the at least one side chain comprises at least 95 wt.-% of acrylic acid in polymerized form.

In a second embodiment of the invention, there is provided an additive for a paint and coatings formulation comprising the graft copolymer of the first aspect.

In a third embodiment of the invention, there is provided a method of making a graft copolymer comprising:
a) polymerizing a first monoethylenically unsaturated monomer selected from the group consisting of esters of methacrylic acid and acrylic acid with straight or branched alcohols having 1 to 3 carbon atoms, in presence of an addition fragmentation chain transfer agent in an amount so that the so formed polymer does not contain more than 5 mole-% of the addition fragmentation chain transfer agent, in an aqueous mixture at a temperature in a range of 50° C. to 100° C. to form a macromonomer in a first aqueous emulsion; and
b) polymerizing the macromonomer in the first aqueous emulsion with an amount of acrylic acid to form a graft copolymer having at least one side chain comprising at least 95 wt.-% acrylic acid on the macromonomer in a second aqueous emulsion.

In a fourth embodiment of the invention, there is provided the use of the graft copolymer of the first aspect for improving the dirt pick-up resistance of a paint or coating.

In a fifth embodiment of the invention, there is provided a method for improving the dirt pick-up resistance of a paint or coating, the method comprising adding to the paint or coating the graft copolymer of the first aspect.

BRIEF DESCRIPTION OF THE FIGURES

FIG. 1 illustrates a $^1$H NMR of alpha methyl styrene dimer content in $CDCl_3$.

FIG. 2 illustrates a molecular weight analysis done by gel permeation chromatography (GPC) in chloroform solvent and by using polystyrene as the standards.

FIG. 3 illustrates a molecular weight analysis done by gel permeation chromatography (GPC) in chloroform solvent and by using polystyrene as the standards.

FIG. 4 illustrates a 13C NMR of a graft copolymer.

FIG. 5 illustrates an image of panels having blank and sample displaying dirt pickup resistance.

As used herein, the term "dirt pick-up resistance" refers to the ability of a coating to resist the adhesion of dirt that contacts the coating so that the coating better maintains its original appearance prior to being exposed to the dirt. As used herein, the term "(meth)acrylate" refers to methacrylates or acrylates.

As used herein, "Tg" is an abbreviation for glass transition temperature, which means the temperature at or above which a glassy polymer will undergo segmental motion of the polymer chain. As used herein, "room temperature" refers to an ambient temperature of 25 degree Celsius (° C.) to 35° C. The Tg of a polymer is typically measured by differential scanning calorimetry (DSC) with heating at a rate of 10° C. per minute using the mid-point in the heat flow versus temperature transition as the Tg value.

As used herein, "VOC" is an abbreviation for volatile organic compound, which is defined as a volatile compound of carbon, excluding methane, carbon monoxide, carbon dioxide, carbonic acid, metallic carbides or carbonates, ammonium carbonate, and exempt compounds according to the Environmental Protection Agency and under, for example, 40 Code of Federal Regulations .sctn.51.100(s). In paint industry, VOC stands for any organic compound which has boiling point less than 250 degree Celsius.

For the purposes of the present disclosure, the term "copolymer" means a polymer derived from more than one species of monomer. The term "graft copolymer" as used herein refers to copolymers formed when polymer chains are chemically attached as side chains to a polymeric backbone or macromonomer. A "macromonomer" of the present invention is a water-insoluble polymer having at least one terminal ethylenically unsaturated group that is capable of being polymerized to form a graft copolymer. The macromonomer may also be referred to as "graft base". The polymeric side chain may also be referred to as "graft segment". In a graft polymer the graft segments are grafted onto the graft base.

The inventive graft polymer is therefore a structure in which the acrylic acid side chains b) are grafted onto the (meth)acrylic acid ester-based macromonomer graft base, or backbone, a).

Embodiments of the present invention provides a graft copolymer comprising a macromonomer and at least one side chain on the macromonomer. The macromonomer comprises in polymerized form a first monoethylenically unsaturated monomer and no more than 5 mole % of an addition fragmentation chain transfer agent. Exemplary first monoethylenically unsaturated monomer includes those selected from a group consisting of methyl methacrylate, methyl acrylate, ethyl acrylate, In one preferred embodiment the first monoethylenically unsaturated monomer is methyl methacrylate (MMA).

The macromonomer comprises in a preferred embodiment at least 95 wt.-% of the first monoethylenically unsaturated monomer. Preferably, the content in the first monoethylenically unsaturated monomer is at least 96 wt.-%, more preferably at least 98 wt.-%. In one particularly preferred embodiment, the content in the first monoethylenically unsaturated monomer is at least 99.5 wt.-%. Monomers making up the remainder to balance the macromonomer up to 100 wt.-% may preferably be hydrophobic monomers. Among those, (metha)crylic acid esters with alcohols having 6 to 18 carbon atoms are preferred, e.g. (Meth)Acrylic acid 2-Ethylhexylester.

The first monoethylenically unsaturated monomer in polymerized form is preferably present in the graft copolymer in an amount from 30 mole percent to 70 mole percent. In one more preferred embodiment, the first monoethylenically unsaturated monomer in polymerized form is present in an amount of 40 to 60 mole percent.

The first monoethylenically unsaturated monomer is polymerized using an addition fragmentation chain transfer agent to form the macromonomer. In a preferred embodiment, the addition fragmentation chain transfer agent is selected from the group consisting of dimer, trimer or tetramer of alpha-methyl styrene, phenyl-substituted alpha-methyl styrene, α-substituted methyl acrylates, α-benzyloxy styrene, allyl chlorides, allyl ethers and allyl peroxides. In a specific embodiment, alpha-methyl styrene dimer (AMSD) is preferred.

It is well-understood that when an addition fragmentation chain transfer (AFCT) agent is used, the macromonomer is terminated by units derived from the AFCT agent. The AFCT agent advantageously provides the macromonomer a terminal polymerizable double bond or unsaturation, which can be further polymerized to form the graft copolymer. The chain transfer agent is present in an amount of no more than 5 mole % of the macromonomer, or the graft base.

As used herein, the term "AFCT agent is present" also refers to units derived from AFCT agent which forms part of the graft copolymer. The mole percent of AFCT agent or units derived from the AFCT agent in the graft copolymer is calculated from nuclear magnetic resonance (NMR) spectra. In one embodiment, the chain transfer agent is present no more than 4 mole % of the macromonomer. In another embodiment, the chain transfer agent is present in a range of 0.1 mole % to 3.5 mole % of the macromonomer.

The macromonomer is further polymerized with a second monoethylenically unsaturated monomer which is acrylic acid to form the graft copolymer. Acrylic acid forms the essential or exclusive part of the side chain. The side chain comprises at least 95 wt.-% of acrylic acid. Preferably, the content in acrylic acid is at least 96 wt.-%, more preferably at least 98 wt.-%. In one particularly preferred embodiment, the content in acrylic acid is at least 99.5 wt.-%.

The second monoethylenically unsaturated monomer in polymerized form is present in the graft copolymer in an amount of 30 to 70 mole percent, preferably in an amount of 30 to 70 mole percent.

The number average molecular weight of the graft copolymer is preferably in a range of 5000 gram/mole to 35000 gram/mole. In another embodiment, the number average molecular weight of the graft copolymer is in a range of 10000 gram/mole to 25000 gram/mole.

The number average molecular weight of polymers mentioned herein is to be measured by GPC using a polystyrene standard. The polymer sample is dissolved in chloroform at a concentration of 0.1 wt.-%, followed by filtration through a 0.45 μm PTFE (polytetrafluoroethylene) membrane filter. The analysis is performed by injecting 100 μl of the above solution. The mobile phase used is chloroform at a flow rate of 1 ml/min. Detection is carried out by the use of refractive index (RI) detector. The system was calibrated with narrow polystyrene standards.

Embodiments of the present invention provide methods for preparing the graft copolymers and aqueous compositions comprising the graft copolymers. The first monoethylenically unsaturated monomer is polymerized in presence of an addition fragmentation chain transfer agent in an aqueous mixture at a temperature in a range of 50° C. to 100° C. to form a macromonomer in a first aqueous emulsion. The macromonomer in the first aqueous emulsion is polymerized with a second monoethylenically unsaturated monomer being acrylic acid to form a graft copolymer having at least one side chain on the macromonomer in a second aqueous emulsion.

The polymerization reaction to form the macromonomer and the graft copolymer can be carried out by a solution, bulk, suspension or emulsion polymerization process. In one embodiment, the polymerization is by emulsion polymerization process.

When polymerization is by emulsion polymerization process the aqueous mixture, and the first aqueous emulsion may preferably include an emulsifier. Any emulsifier may be used that is effective in emulsifying the monomers such as for example anionic, cationic, or nonionic emulsifiers. Examples of nonionic emulsifiers which may be used are alkyl polyglycol ethers such as ethoxylation products of lauryl, oleyl or stearyl alcohol or of mixtures such as coconut fatty alcohol; alkylphenol polyglycol ethers such as ethoxylation products of octylphenol or nonylphenol, diisopropylphenol, triisopropylphenol or of di- or tri-tert-butylphenol; or ethoxylation products of polypropylene oxide.

Suitable ionic emulsifiers are primarily anionic emulsifiers. These may comprise the alkali metal salts or ammonium salts of alkyl-, aryl- or alkylaryl-sulfonates or -phosphonates, alkyl, aryl or alkylaryl sulfates or phosphates, or compounds with other anionic end groups, the presence of oligoethylene oxide or polyethylene oxide units between the hydrocarbon radical and the anionic group also being possible. Typical examples are sodium lauryl sulfate, sodium undecyl glycol ether sulfate, sodium lauryl diglycol sulfate, sodium tetradecyl triglycol sulfate, sodium octylphenol glycol ether sulfate, sodium dodecylbenzenesulfonate, ammonium tri-tert-butylphenol pentaglycol or octaglycol sulfate. In one embodiment, the emulsifier is sodium lauryl sulfate.

The amount of emulsifier in the aqueous mixture is preferably from 0.05 weight percent to 8 weight percent, and more preferably from 0.3 weight percent to 5 weight percent, based on the total weight of the monomers.

The aqueous mixture and the first aqueous emulsion includes a polymerization initiator. The initiator is preferably selected based on such parameters as its solubility in one or more of the other components (e.g., monomers, water); half life at the desired polymerization temperature (preferably a half life within the range of from 30 minutes to 10 hours), and stability. Example initiators include azo compounds such as 2,2'-azobis (isobutyronitrile), 2,2' azo bis amidinopropane dihydrochioride, 4,4'-azobis(4-cyanovaleric acid), 2,2'-azobis [2-methyl-N-(1, 1-bis(hydroxymethyl)-2-(hydroxyethyl)]-propionamide, and 2,2'-azobis [2-methyl-N-(2-hydroxyethyl)]-propionamide; peroxides such as t-butyl hydroperoxide, benzoyl peroxide; sodium, potassium, or ammonium persulphate or combinations thereof.

Redox initiator systems may also be used, such as for example persulphate or peroxide in combination with a reducing agent such as sodium metabisulphite, sodium bisulfite, sodium formaldehyde sulfoxylate, isoascorbic acid, or combinations thereof. The concentration of initiator used during the polymerization process is preferably chosen to obtain the desired degree of polymerization.

Preferably, the concentration of initiator is from 0.2 weight percent to 3 weight percent, and more preferably from 0.5 weight percent to 1.5 weight percent, based on the total weight of monomer.

The temperature of the polymerization reaction to form the macromonomer and the graft copolymer is decided based on the type of initiator selected and the desired polymerization rates. In a preferred embodiment, the aqueous mixture is heated to a temperature in a range of 50° C. to 100° C. to form the macromonomer. In one embodiment, the temperature is in a range of 50° C. to 75° C. Likewise, the temperature of the first aqueous emulsion is in a range of 50° C. to 100° C., preferably in a range of 50° C. to 75° C.

The first monoethylenically unsaturated monomer, initiator, and chain transfer agent may be added in any manner known to those skilled in the art to carry out the polymerization. For example, the monomer, initiator and chain transfer agent may all be present in the aqueous mixture at the start of the polymerization process (i.e., a batch process). Alternatively, one or more of the components may be gradually fed to an aqueous solution (i.e., a continuous or semi-batch process).

For example, it may be desired to gradually feed the entire or a portion of the initiator, monomer, and/or chain transfer agent to a solution containing water. The solution containing water may additionally include emulsifier. In a preferred embodiment, at least a portion of the monomer and chain transfer agent are gradually fed during the polymerization, with the remainder of the monomer and chain transfer agent being present in the aqueous mixture at the start of the polymerization. In this embodiment, the monomer may be fed as is, or suspended or emulsified in an aqueous solution prior to being fed.

The polymerization reaction to form the macromonomer is continued for a time period of 4-10 hours during which the temperature is maintained. In one embodiment, the polymerization reaction to form the macromonomer is continued for a time period of upto 8 hours. After this time period, the macromonomer first aqueous emulsion is brought to room temperature.

The macromonomer produced may be isolated as a solid (e.g., spray dried) and emulsified in water. Also, for example, the macromonomer, if prepared via an emulsion or aqueous based polymerization process, may be used as is, or diluted with water or concentrated to a desired solids level. In a preferred embodiment, the first aqueous emulsion, or a portion of it, is used as such for further polymerization reaction to form the graft copolymer.

The macromonomer is polymerized with a second monoethylenically unsaturated monomer to form the graft copolymer. The second monoethylenically unsaturated monomer is introduced into the first aqueous emulsion, prior to which the monomer is neutralized with a base. In one embodiment, a pH of neutralized second monoethylenically unsaturated monomer is from 6.5 to 10, preferably from 7.0 to 9.0. Suitable base includes aqueous ammonia, alkali metal and alkaline earth metal hydroxide solutions. In one embodiment, the base is sodium hydroxide. As will be appreciated, neutralizing the monomer with a base improves the stability of the emulsion.

The amount of first aqueous emulsion and/or the concentration of the macromonomer and the concentration of second monoethylenically unsaturated monomer to be reacted is decided based on desired graft copolymer composition. In one embodiment, the macromonomer aqueous emulsion and second monoethylenically unsaturated monomer composition are added in amounts to provide a graft copolymer containing as polymerized units a mole ratio in a range of 70:30 to 30:70.

The first aqueous emulsion may additionally include the initiator. Suitable initiators and initiator concentration are as discussed previously. The second monoethylenically unsaturated monomer and initiator may be added in any manner known to those skilled in the art to carry out the emulsion polymerization. The polymerization to form the graft copolymer second aqueous emulsion is conducted for a time period of 4-10 hours during which the temperature is maintained. In one embodiment, the polymerization reaction to form the graft copolymer is continued for a time period of up to 8 hours.

In one embodiment, the polymerization reaction to form the macromonomer and polymerization reaction to form the graft copolymer are conducted in a single vessel. One main advantage of this embodiment is that the macromonomer does not have to be isolated, and the second polymerization can take place simply by adding the monomer composition and initiator to the macromonomer aqueous emulsion.

A solids content of the second aqueous emulsion comprising the graft copolymer is less than 40% by volume. The solids content of second aqueous emulsion can be manipulated to desired level without aggregation of the solids using known techniques in polymerization. In one embodiment, second aqueous emulsion has a solids content of 2% by volume to 40% by volume.

The graft copolymer and/or the aqueous composition comprising the graft copolymer finds application in paint and coatings. In one embodiment, the second aqueous emulsion or aqueous composition comprising the graft copolymer is a component of the paint and/or coatings formulation. A particular advantage of the present invention is that the second aqueous emulsion comprising the graft copolymer can be used as such to form a paint and/or coatings formulation or a component of it. Additionally, the second aqueous emulsion does not contain any heavy metals or sulphur-based compounds unlike prior methods which utilize polymerization reaction using cobalt-based chain transfer agents or mercaptan chain transfer agents. Therefore, further processing or additional steps are not required to eliminate heavy metals or sulphur compounds from the aqueous composition of the present invention.

Another advantage of the invention is that the reaction is carried out in water and without the aid of any organic solvents and hence the second aqueous emulsion or the aqueous composition comprising the graft copolymer does not contain any organic solvents. For formulating paint or coatings with zero-VOC, the method or process of the present invention are ideally suited. Unlike prior methods, additional steps or processing is not required to eliminate unwanted solvents. Surprisingly, the graft copolymers when incorporated into paint and/or coatings formulations exhibit enhanced property of dirt pick-up resistance even at low concentrations. In one embodiment, the graft copolymers are present in paint and/or coatings formulations at a concentration of at most 5% by weight. In another embodiment, the graft copolymer is present in paint and/or coatings formulations at a concentration of at most 3% by weight. In yet another embodiment, the graft copolymer is present in paint and/or coatings formulations at a concentration of at most 1% by weight.

The graft copolymer of present invention is useful, for example, as exterior architectural paints, interior architectural paints, industrial paints, and like. A typical architectural paint and coatings formulations comprising the graft copolymer may include, for example, binders or resins (10-50% by weight), carrier (25-80% by weight), surfactants (0.5-10% by weight), pigments (0.5-40% by weight) and may also include additional additives, for improving a property of the formulation and/or the coatings.

Example binders or resins include acrylic resin, polyester resin, alkyd resin, silicon resin, fluoro resin, epoxy resin and polyurethane resin. In a preferred embodiment, the resin is acrylic.

For water-based coatings the carrier is water. Although, in some case, it may be desirable to use a water compatible carrier such as an alcohol comprising isopropyl alcohol for example; a glycol ether such as diethylene glycol butyl ether or propylene glycol methyl ether; or a polyglycol such as ethylene glycol or propylene glycol.

Pigments suitable for use in architectural coating compositions are generally known in the art, and reference may be had to Jaffe, E. E. 2004. Pigments, Organic. Kirk-Othmer Encyclopedia of Chemical Technology. Extender pigments such as calcium carbonate, talc, clay, and silicon dioxide, can also be employed.

Surfactants are employed to emulsify the binder or resin in the carrier. Any anionic or nonionic surfactant can be used. Suitable nonionic surfactants are ethoxylated alcohols. Suitable anionic surfactants include sulfonated and sulfated alkyl, aralkyl and alkaryl anionic surfactants; alkyl succinates; alkyl sulfosuccinates and N-alkyl sarcosinates. Representative surfactants are the sodium, magnesium, ammonium, and the mono-, di- and triethanolamine salts of alkyl and aralkyl sulfates, as well as the salts of alkaryl sulfonates.

The additional additives include, for example, thickeners; rheology modifiers; dyes; sequestering agents; biocides; dispersants; pigments, such as, titanium dioxide, organic pigments, carbon black; extenders, such as calcium carbonate, talc, clays, silicas and silicates; fillers, such as glass or polymeric microspheres, quartz and sand; anti-freeze agents; plasticizers; adhesion promoters such as silanes; coalescents; wetting agents; surfactants; slip additives; crosslinking agents; defoamers; colorants; tackifiers; waxes; preservatives; freeze/thaw protectors; corrosion inhibitors; and anti-flocculants.

The aqueous coating composition of the present invention is prepared by techniques which are well known in the coatings art. Preferably, the aqueous coating composition contains less than 5% VOC by weight based on the total weight of the coating composition; more preferably the aqueous coating composition contains less than 3% VOC by weight based on the total weight of the coating composition; even more preferably the aqueous coating composition contains less than 1.7% VOC by weight based on the total weight of the coating composition.

The paint and coating formulations of the present invention can be used as automotive coatings such as refinishes, primers, basecoats, undercoats, overcoats and clear coats. The graft copolymers are also suitable for use in compositions for maintenance finishes for a wide variety of substrates, such as steel, copper, brass and aluminum or non-metallic substrates, such as, wood, leather, polymeric materials and concrete.

EXAMPLES

Example 1

Preparation of Poly(Methyl methacrylate) macromonomer first aqueous emulsion: About 1 gram (gm) of sodium lauryl sulphate was added to 64 gm of water with a stirring speed of 500 rpm using IKA Eurostar 60 digital overhead stirrer. To that, 15 gm (0.15 mole) of methyl methacrylate and 0.72 gm (0.0030 mole) of alpha methyl styrene dimer (AMSD) was added drop wise. The temperature of the aqueous mixture was increased to 60° C. 0.327 gm (0.002 mole) of 2,2' azo bis iso butyro nitrile was added to aqueous mixture and the polymerization reaction was let to continue for 7 hours to form macromonomer first aqueous emulsion.

The first aqueous emulsion was evaluated for the unreacted monomer if any by FTIR analysis. The AMSD content was found out using $^1$H NMR in $CDCl_3$ and was found to be 3.19 mole % as shown in FIG. 1. The molecular weight analysis was done by performing gel permeation chromatography (GPC) in chloroform solvent and by using polystyrene as the standards as seen in FIG. 2. A number average molecular weight was found to be 23,446 g/mole and the weight average molecular weight was 44,756 g/mole with a polydispersity of 1.909. The intrinsic viscosity of the macromonomer in chloroform as measured by Ubbelohde viscometer was about 0.3353 dl/g at 30° C.

Example 2

Preparation of Poly(Methyl methacrylate-g-Acrylic acid) graft copolymer: About 66.81 gm of first aqueous emulsion from Example 1, which contains 12.36 gm of Poly(methyl methacrylate) (0.124 mole) was taken and to that 1 gm of sodium lauryl sulphate was added. 4.45 gm (0.0618 mole) of neutralized acrylic acid (neutralized with sodium hydroxide) was added drop wise to this emulsion with continuous stirring at 500 rpm using IKA Eurostar 60 digital overhead stirrer. The temperature of the reaction mixture was maintained at 60° C. 0.59 gm (0.0036 mole) of 2,2' azo bis iso butyro nitrile was added to reaction mixture and reaction continued for 7 hours to form second aqueous emulsion containing graft copolymers.

The molecular weight analysis was done in chloroform using GPC with polystyrene standards and is given in FIG. 3. The number average molecular weight of the graft copolymer was found to be 10,188 grams/mole and the weight average molecular weight was 27,955 g/mole resulting in a polydispersity of 2.744. The glass transition temperatures were found to be 78° C. and 102° C. The 13C NMR of graft copolymer is shown in FIG. 4. The composition of the graft copolymer from $^{13}$C NMR is 58.2 mole % of methyl methacrylate, 40 mole percent of acrylic acid and 1.8 mole percent of AMSD. The intrinsic viscosity of the graft copolymer in chloroform as measured by Ubbelohde viscometer was about 0.3506 dl/g at 30° C. which is 0.0153 dl/g more than that of the macromonomer of Example 1.

Example 3

Preparation of paint samples and property testing: Paint samples were prepared by mixing 0.5%, 1% and 2% of the second aqueous emulsion in a commercial exterior water-based paint sample (Nerolac Excel Total from Kansai Nerolac Paints Limited) with continued stirring at 200 rpm for 20 minutes to give sample 1, sample 2 and sample 3.

The pH of the paint sample after additive mixing was 8.6 which falls within the permitted range of 8-9.5 pH for commercial paints. There were no precipitation or coagulation of the additive after mixing in paint samples thus clearing Additive Miscibility Test.

Example 4

Dirt pick-up resistance test: Commercial paper panels of 1 inch by 1 inch were taken. A commercial Bird film Applicator was used to drawdown the paint on the commercial paper panels. The corners of the three paper panels were coated with Nerolac Excel Total from Kansai Nerolac Paints Limited to form the blanks. On the opposite corner of the paper panels paint samples 1-3 of Example 3 were applied using Bird film Applicator to form the respective sample panels 1-3. The thickness of the coating on the panel were about 100 micrometers. The panels were left for drying for 7 days at room temperature of 25° C.

The dried panels were taken in a container for dirt pick-up resistance test. About 25-30 grams of activated charcoal powder was added in to the container. It is then shaken for 15 times and left inside the container for 2 hours. After 2 hours the dirt pickup of the samples were visually compared with that of the blank. FIG. 5 is the image of the panels having blank and sample displaying dirt pickup resistance. FIG. 5 shows the enhanced dirt pick-up resistance of the sample when compared to blank.

Example 5

Accelerated stability test: About 2% of the second aqueous emulsion was mixed with the commercial paint sample (Nerolac Excel Total). The sample was tested for stability by observing the viscosity over time. The initial viscosity upon addition of the second aqueous emulsion was 104 KU. The sample was kept at 55° C. for 30 days and at end of the period the viscosity of the paint formulation was measured and was found to be 103 KU. This study confirms that the additive is quite stable in the paint and coatings formulation and there is no appreciable change in the viscosity over time. Also, there was no precipitation or coagulation and paint was in flowable form.

The invention claimed is:

1. A graft copolymer comprising:
   a) a polymerized macromonomer, wherein the macromonomer comprises in polymerized form at least 95 wt.-% of a first monoethylenically unsaturated monomer selected from a group consisting of esters of methacrylic acid and acrylic acid with straight or branched alcohols having 1 to 3 carbon atoms and between 0.1 and no more than 5 mole percent of an addition fragmentation chain transfer agent; and
   b) at least one side chain on the polymerized macromonomer, wherein the at least one side chain comprises at least 95 wt.-% of acrylic acid in polymerized form.

2. The graft copolymer of claim 1, wherein the number average molecular weight of the graft copolymer is in the range of 5,000 gram/mole to 35,000 gram/mole, measured by gel permeation chromatography using chloroform as a mobile phase.

3. The graft copolymer of claim 1, wherein the molar ratio of the polymerized macromonomer a) to the side chain b) is in the range of 70:30 to 30:70.

4. The graft copolymer according to claim 1, wherein the graft copolymer has a first glass transition temperature (Tg) and a second Tg as measured by differential scanning calorimetry with heating at a rate of 10° C. per minute and wherein the first Tg is in a range of 70° C. to 105° C. and the second Tg is in a range of 90° C. to 110° C.

5. The graft copolymer according to claim 1, wherein the first monoethylenically unsaturated monomer is methyl methacrylate.

6. The graft copolymer of claim 5, wherein the molar ratio of methyl methacrylate to acrylic acid is 60:40 to 40:60.

7. The graft copolymer according to claim 1, wherein the addition fragmentation chain transfer agent is selected from the group consisting of dimer, trimer or tetramer of alpha-methyl styrene, phenyl-substituted alpha-methyl styrene, alpha-substituted methyl acrylate, alpha-substituted benzyloxy styrene, allyl chloride, allyl ether and allyl peroxide.

8. An aqueous composition comprising the graft copolymer according to claim 1.

9. The aqueous composition according to claim 8, wherein the graft copolymer is present in an amount of 0.1 to 5 wt.-%.

10. The aqueous composition according to claim 8, wherein the graft copolymer is present in an amount of 0.25 to 3.5 wt.-%.

11. A method for improving the dirt pick-up resistance of a paint or coating comprising the step of adding a graft copolymer comprising:
 a) a polymerized macromonomer, wherein the macromonomer comprises in polymerized form at least 95 wt.-% of a first monoethylenically unsaturated monomer selected from a group consisting of esters of methacrylic acid and acrylic acid with straight or branched alcohols having 1 to 3 carbon atoms and between 0.1 and no more than 5 mole percent of an addition fragmentation chain transfer agent; and
 b) at least one side chain on the polymerized macromonomer, wherein the at least one side chain comprises at least 95 wt.-% of acrylic acid in polymerized form, to the paint or coating.

12. A method of making a graft copolymer comprising:
 a) polymerizing at least 95 wt.-% of a first monoethylenically unsaturated monomer selected from the group consisting of esters of methacrylic acid and acrylic acid with straight or branched alcohols having 1 to 3 carbon atoms, in presence of an addition fragmentation chain transfer agent in an amount so that the so formed polymer contains between 0.1 and not more than 5 mole percent of the addition fragmentation chain transfer agent, in an aqueous mixture at a temperature in a range of 50° C. to 100° C. to form a polymerized macromonomer in a first aqueous emulsion; and
 b) polymerizing the polymerized macromonomer in the first aqueous emulsion with an amount of acrylic acid to form a graft copolymer having at least one side chain comprising at least 95 wt.-% acrylic acid on the polymerized macromonomer in a second aqueous emulsion.

* * * * *